US010228953B2

(12) United States Patent
Bombacino et al.

(10) Patent No.: US 10,228,953 B2
(45) Date of Patent: *Mar. 12, 2019

(54) REBOOTING TIMING ADJUSTMENT FOR IMPROVED PERFORMANCE

(71) Applicant: International Business Machines Corporation, Armonk, NY (US)

(72) Inventors: Vinicio Bombacino, Rome (IT); Claudio Falcone, Rome (IT); Luca Lazzaro, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/278,828

(22) Filed: Sep. 28, 2016

(65) Prior Publication Data

US 2017/0168847 A1 Jun. 15, 2017

Related U.S. Application Data

(63) Continuation of application No. 14/969,485, filed on Dec. 15, 2015, now Pat. No. 9,507,605.

(51) Int. Cl.
*G06F 15/177* (2006.01)
*G06F 9/00* (2006.01)
*G06F 9/4401* (2018.01)
*G06F 8/65* (2018.01)
*H04L 12/24* (2006.01)
*G06F 3/12* (2006.01)
(Continued)

(52) U.S. Cl.
CPC .............. *G06F 9/4406* (2013.01); *G06F 8/65* (2013.01); *G06F 9/4401* (2013.01); *G06F 3/123* (2013.01);
(Continued)

(58) Field of Classification Search
CPC ...... G06F 8/65; G06F 11/1433; G06F 9/4403; G06F 15/177; G06F 3/123;
(Continued)

(56) References Cited

U.S. PATENT DOCUMENTS 5,951,686 A * 9/1999 McLaughlin ....... G06F 11/1417
713/2
7,584,467 B2 9/2009 Wickham et al.
(Continued)

OTHER PUBLICATIONS

Ying-Liu Hsu et al., "Modeling of Multi-Server Repair Problem With Switching Failure and Reboot Delay and Related Profit Analysis", Computers and Industrial Engineering 69 (2014) 21-28.
(Continued)

*Primary Examiner* — Xuxing Chen
(74) *Attorney, Agent, or Firm* — Heslin Rothenberg Farley & Mesiti P.C.

(57) ABSTRACT

A method, computer program product, and system identify a low-cost time to re-boot a system. The method includes a processor obtaining a request for a re-boot of a system. The processor obtains identifiers of uncompleted tasks executing in the system. Based on obtaining the identifiers, the processor obtains a task cost of each task of the uncompleted tasks, where a value of the task cost of each task relates to a portion of each task completed by the processor at a given time. The processor determines, based on the task costs associated with the uncompleted tasks, a re-boot cost for re-booting the system at the given time. The processor determined a system cost for not re-booting the system at the given time. The processor compares the re-boot cost to the system cost to determine whether to re-boot the system at the given time in response to the request.

18 Claims, 5 Drawing Sheets

(51) Int. Cl.
*G06F 17/30* (2006.01)
*G06F 12/06* (2006.01)
*G06F 11/14* (2006.01)
*G06F 9/32* (2018.01)

(52) U.S. Cl.
CPC ............ *G06F 3/1225* (2013.01); *G06F 9/328* (2013.01); *G06F 11/1433* (2013.01); *G06F 12/0646* (2013.01); *G06F 15/177* (2013.01); *G06F 17/30345* (2013.01); *H04L 41/082* (2013.01)

(58) Field of Classification Search
CPC ............ G06F 17/30345; G06F 3/1225; G06F 12/0646; G06F 9/328; H04L 41/082
See application file for complete search history.

(56) References Cited

U.S. PATENT DOCUMENTS

| | | | |
|---|---|---|---|
| 7,774,589 B2 | 8/2010 | Corrao et al. | |
| 7,873,957 B2 | 1/2011 | Nallipogu et al. | |
| 8,296,756 B1 | 10/2012 | Feeser et al. | |
| 2008/0216066 A1* | 9/2008 | Oh | G06F 8/658 717/173 |
| 2008/0263347 A1* | 10/2008 | Chen | G06F 9/4416 713/2 |
| 2009/0077367 A1* | 3/2009 | Bernardini | G06F 9/4418 713/2 |
| 2009/0187899 A1 | 7/2009 | Mani et al. | |
| 2010/0042820 A1* | 2/2010 | Clemm | G06F 15/177 713/2 |
| 2014/0223155 A1* | 8/2014 | Vasseur | G06F 9/4405 713/2 |

OTHER PUBLICATIONS

Peter Mell et al., "The NIST Definition of Cloud Computing", National Institute of Standards and Technology, U.S. Department of Commerce, NIST Special Publication 800-145, Sep. 2011, 7 pages.

* cited by examiner

100

110

Program code obtains a request for a system re-boot.

120

Program code obtains identifiers of the tasks affected by the system re-boot.

130

Based on obtaining the identifiers, the program code assigns each task a cost.

140

Program code determines a system re-boot cost based on the costs associated with the tasks.

150

Program code determines a cost of not re-booting over time.

160

Program code compares the costs associated with the tasks to the cost of not re-booting to determine a time when it is cheaper to re-boot a system as compared to re-booting automatically based on the request.

FIG. 6

REBOOTING TIMING ADJUSTMENT FOR IMPROVED PERFORMANCE

BACKGROUND

Notifications of system vulnerabilities, which require the application of a fix or patch to existing systems, can occur while the system is in the process of executing various tasks. When a patch or fix is only effective after reboot, applying the patch immediately after the notification would disrupt these tasks. In order to reboot the system, these tasks would be terminated and the system would re-execute them from the beginning after reboot. Having to re-execute tasks that were already in progress impacts the efficiency of the system by wasting the resources of the system. When the system is running longer tasks, which would be terminated during a reboot, re-executing these longer tasks in particular wastes computer resources and affects the efficiency of the system as a whole. Although users can sometimes delay the application of a fix or patch, and the subsequent reboot, by selecting an option to delay this application, enabling certain tasks to complete rather than be terminated, in certain cases, the delay window is not long enough to allow longer tasks to complete, requiring these longer task to re-execute, from the beginning, after the system is re-booted.

SUMMARY

Shortcomings of the prior art are overcome and additional advantages are provided through the provision of a computer program product for identifying a cost-effective time to re-boot a system. The computer program product comprises a storage medium readable by a processing circuit and storing instructions for execution by the processing circuit for performing a method. The method includes, for instance: obtaining, by a processor, a request for a re-boot of a system; obtaining, by the processor, identifiers of uncompleted tasks executing in the system; based on obtaining the identifiers, obtaining, by the processor, a task cost of each task of the uncompleted tasks, wherein a value of the task cost of each task relates to a portion of each task completed by the processor at a given time; determining, by the processor, based on the task costs associated with the uncompleted tasks, a re-boot cost for re-booting the system at the given time; determining, by the processor, a system cost for not re-booting the system at the given time; and comparing, by the processor, the re-boot cost to the system cost to determine whether to re-boot the system at the given time in response to the request.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code.

Program code executing on a processor in a computing environment may detect a vulnerability and/or may receive a notification of a system vulnerability. Addressing this vulnerability may require the program code to apply a fix or a patch, and for the fix or the patch to take effect, the program code may re-boot the system. Re-booting a system disrupts all tasks that are in progress. In an embodiment of the present invention, rather than apply the fix or patch immediately, or apply the fix or patch after a delay of an arbitrary length, program code determines, based on the processes (e.g., programs, tasks, routines, instructions) executing in the computing environment affected by a re-boot, a time to re-boot the system that will maintain the efficiency of the system. In an embodiment of the present invention, the program code will select a time from within a predefined timeframe. The time selected by the program code will represent a time that the system may be rebooted that will minimize the impact of the re-boot on ongoing activities and therefore represent a lower cost to the resources of the system.

In an embodiment of the present invention, program code executed by a processor obtains a request for a re-boot of a system. The program code obtains identifiers of uncompleted tasks executing in the system. Based on obtaining the identifiers, the program code obtains a task cost of each task of the uncompleted tasks, where a value of the task cost of each task relates to a portion of each task completed by the processor at a given time. The program code determines, based on the task costs associated with the uncompleted tasks, a re-boot cost for re-booting the system at the given time. The program code determined a system cost for not re-booting the system at the given time. The program code compares the re-boot cost to the system cost to determine whether to re-boot the system at the given time in response to the request.

In an embodiment of the present invention, the program code detects a vulnerability and addressing the vulnerability requires applying a patch and re-booting the system. In a further embodiment of the present invention, the program code determines that the re-boot cost is less than or equal to the system cost at the given time. Based on the determining that the re-boot cost is less, the program code applies the patch; and reboots the system at the given time. Based on completing the rebooting, the program code may restart the uncompleted tasks.

In an embodiment of the present invention, the system cost includes a quantified risk associated with failing to apply an update to the system, where the update corrects the vulnerability. In an embodiment of the present invention, the value of the task cost includes a cost to the system associated with killing the task.

In an embodiment of the present invention the given time includes a window of time.

In an embodiment of the present invention, a portion of the uncompleted tasks executing in the system include direct user tasks.

In an embodiment of the present invention, the program code determines that the re-boot cost is less than or equal to the system cost during a portion of the given time and the program code reboots the system during the portion of the given time.

In an embodiment of the present invention, the program code determined that the re-boot cost is less than or equal to the system cost at the given time and the program code schedules the re-boot at the given time. The program code alerts a user of the scheduled system re-boot. The program code may obtain a request from the user not to re-boot the system at the given time, and based on the obtaining the request from the user, the program code may cancel the scheduled system re-boot.

In an embodiment of the present invention, the program code obtains an indication of an action in the system, where the action was selected from a group of predefined actions. The program code analyzes the impact of the action on the re-boot cost and the system cost and adjusts at least one of: the re-boot cost or the system cost, based on the impact. Based on the adjusting, the program code replaces the given time with a new re-boot time and schedules the re-boot at the new time.

Figure 1:
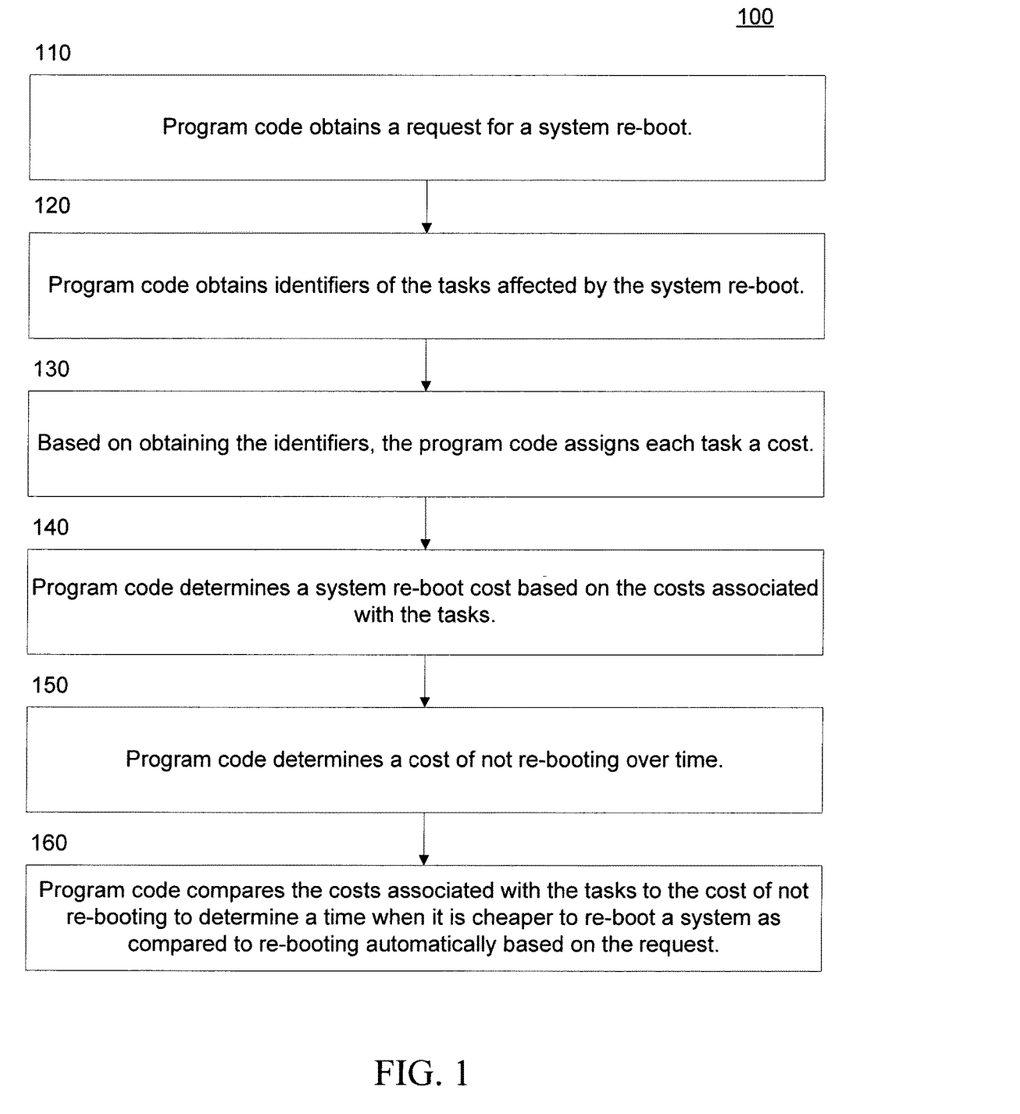
FIG. 1 is a workflow diagram depicting aspects of the present technique.

FIG. 1 is a workflow 100 depicting certain aspects of embodiments of the present invention. In particular, the workflow 100 illustrates program code executed by a processor determines a time when the system may be re-booted, where rebooting at this time will minimize the impact of the re-boot on ongoing activities (e.g., tasks) and therefore represent a lower cost to the resources of the system.

In an embodiment of the present invention, the program code obtains a request for a system re-boot (110). As aforementioned, program code executing on a processor in a computing environment may detect a vulnerability and/or may receive a notification of a system vulnerability and addressing this vulnerability may require the program code to apply a fix or a patch, and for the fix or the patch to take effect, the program code may re-boot the system. In an embodiment of the present invention, the program code receives a request for a system re-boot based on either these circumstances or additional circumstances, understood by one of skill in the art, that may necessitate and/or benefit from, a re-booting of the computer system.

In an embodiment of the present invention, the program code obtains identifiers of the tasks affected by the system re-boot (120). Tasks affected by a re-boot are tasks that are in progress where re-booting while the task runs would affect the efficiency of the tasks. For example, if interrupted by a re-boot, some of the tasks may need to re-start and all the activities (work) that had been completed at the time of the re-boot would be lost.

In an embodiment of the present invention, based on obtaining the identifiers, the program code assigns each task a cost (130). The cost may be represented by a function, e.g. F(p,t), where p represents the task and t represents the time. In an embodiment of the present invention the cost represents the cost to the system associated with killing the task. The cost includes the jobs that were completed before the re-boot that must be repeated as this progress will be lost during a re-boot. In an embodiment of the present invention, the cost function models the task(s) performed through a process.

The manner in which a cost is assigned to a task can take different forms across various embodiments of the present invention. For example, in an embodiment of the present invention, a user can assign a cost to a task manually when the user first initiates the task, for example, the user may select a cost by scrolling through a list of costs, e.g., cost functions. In an embodiment of the present invention, program code may assign a cost to a task automatically, when initiating the task or at any time when the task is active or inactive. In an embodiment of the present invention, the cost of a given task can be a parameter that is associated with the task that is predefined, for example, by a software manufacturer. Thus, when the software is installed, the program code may obtain the costs associated with various tasks that comprise the software.

In an embodiment of the present invention, the program code determines a system re-boot cost based on the costs associated with the tasks (140). For example, the program code may determine the sum of the cost functions assigned to the individual tasks, as illustrated below by Equation 1.

$$R(t) = \sum_{i=1}^{n} f(p_i, t) \qquad \text{(Equation 1)}$$

In an embodiment of the present invention, the program code determines a cost of not re-booting over time (i.e., delaying a re-boot) (150). The cost of not re-booting can be understood as a security risk of failing to apply an update. The cost associated with not re-booting and/or delaying a re-boot, can be represented by the cost function g(u, t). In this representation u represents the update (the update that necessitates the re-boot to take effect) and t represents time. This function demonstrates how delaying an update may also represent a cost to a computer system.

Figure 2:
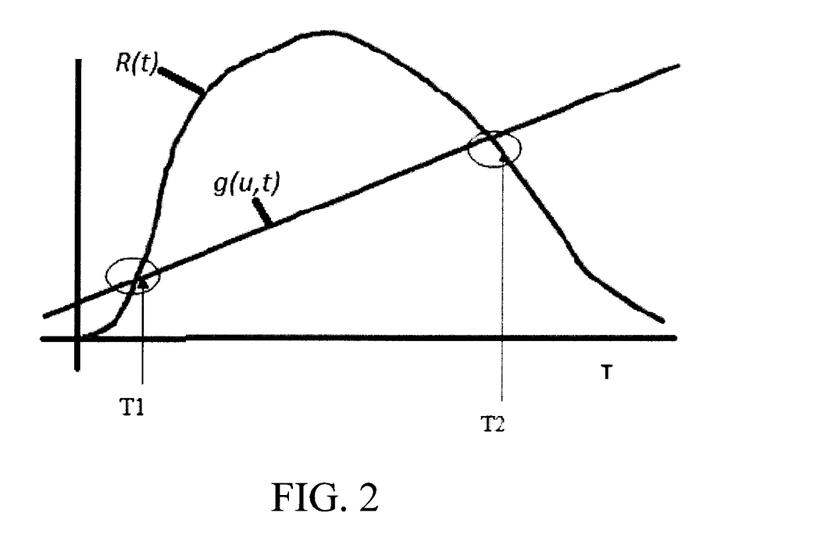
FIG. 2 illustrates certain aspects of some embodiments of the present invention.
Figure 3:
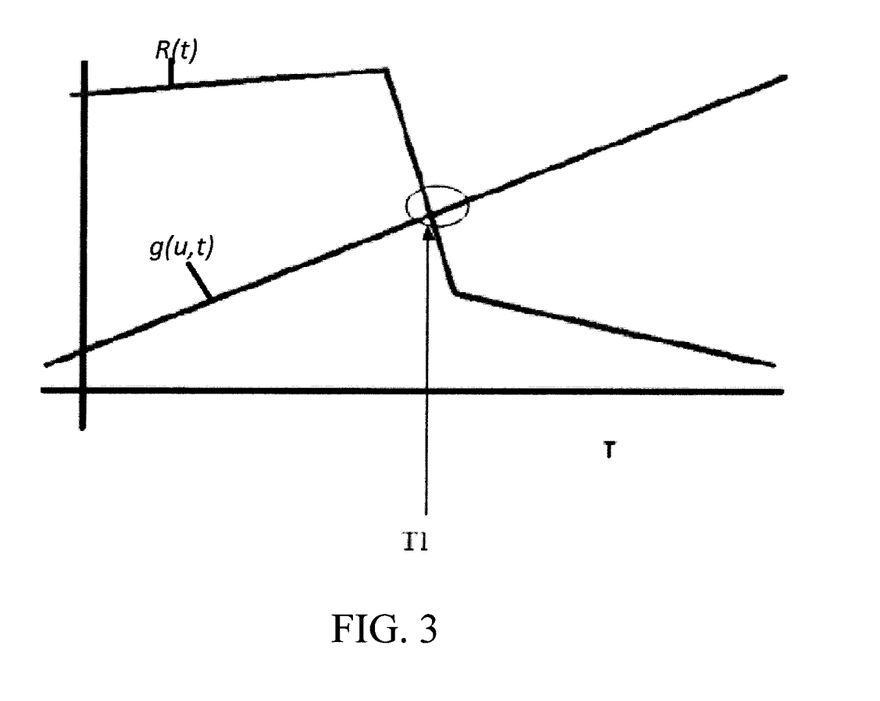
FIG. 3 illustrates certain aspects of some embodiments of the present invention.

The program code compares the costs associated with the tasks to the cost of not re-booting to determine a time when it is cheaper to re-boot a system as compared to re-booting automatically based on the request (160). The time may include a window or period of time. FIGS. 2-3 illustrate how the program code can contrast the costs associated with the tasks, R(t), as seen in Equation 1 above, with the cost of not re-booting, g(u, t).

As understood by one of skill in the art, costs associated with the tasks, R(t) may be incurred primarily due to processes associated to the direct user tasks. Tasks executing on the system that are associated with inner system processes are generally running and stoppable without consequence, and therefore contribute only null cost.

As understood from FIGS. 2-3, the cost of not re-booting, g(u, t), may increase based on the increased risk to a system when application of a patch is delayed beyond when the patch is available.

Although FIGS. 2-3 demonstrate certain trends related to the costs, the trends can differ across different systems and based on the tasks in progress and the necessity of a given re-boot. In these figures, T1 and T2 represent different points in time that the program code has identified in determining a timeframe for re-booting a computer system during which the cost of the re-boot to the system as a whole is reduced.

As seen in FIGS. 2-3, by comparing the costs associated with the tasks, R(t), to the cost of not re-booting, g(u, t), the program code determines timeframe boundaries (see, e.g., FIG. 1, 160). Referring to FIG. 2, the program code, utilizing the data displayed in this illustration, may recommend (and/or automatically initiate) a re-boot until T1 and/or after T2. Referring to FIG. 3, the program code may recommend (and/or automatically initiate) a re-boot after T1.

In an embodiment of the present invention, an embodiment of the present invention may execute concurrently with the present functionality that enable a user to postpone a reboot. For example, program code may identify a time for re-boot, but may still enable the user to delay the re-boot to a time outside of the time identified by utilizing a postponing policy. Thus, in certain embodiments of the present invention, the user can override a recommended and cost-effective re-boot time.

In an embodiment of the present invention, the program code may select an action, including from a group of predefined actions, including but not limited to a previously configured list of allowable actions, to execute. These actions may include, but are not limited to, enabling anti-virus protection and/or disable a given service. By taking this action, the program code may change the system cost functions. After taking an action that affects the costs functions, the program code may analyze the costs, as described above, and based on the new analysis, may recommend a different time to re-boot the system, including a different timeframe, or may automatically re-boot the system at the different time or during the different timeframe. In an embodiment of the present invention, the different time may represent a time when the system can be re-booting at a lower cost to the system.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 4:
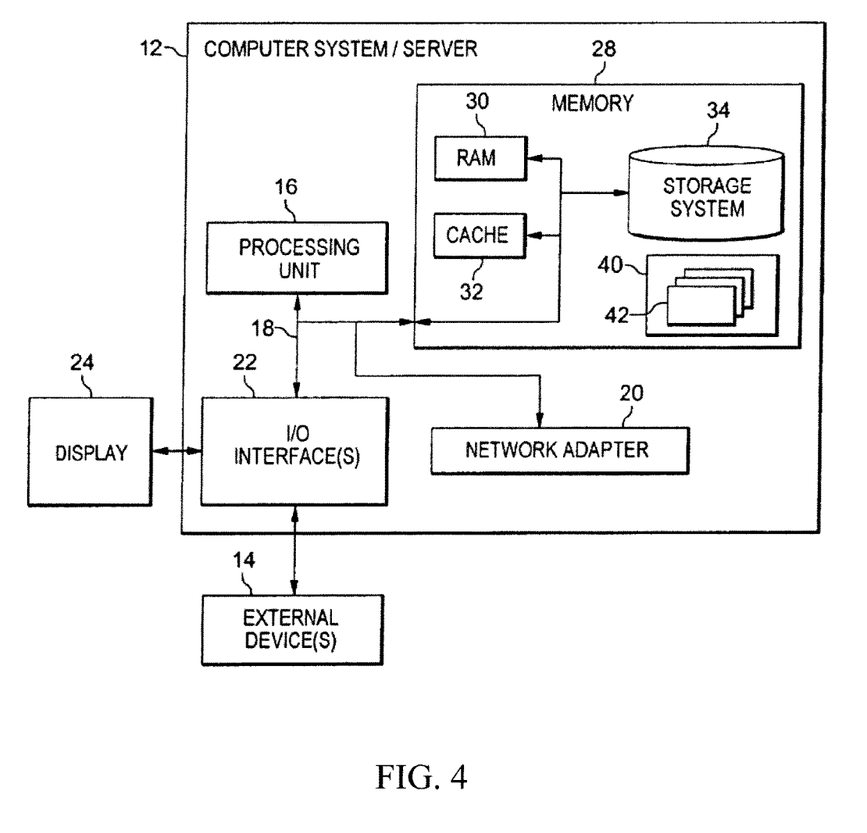
FIG. 4 depicts one embodiment of a cloud computing node.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/ server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
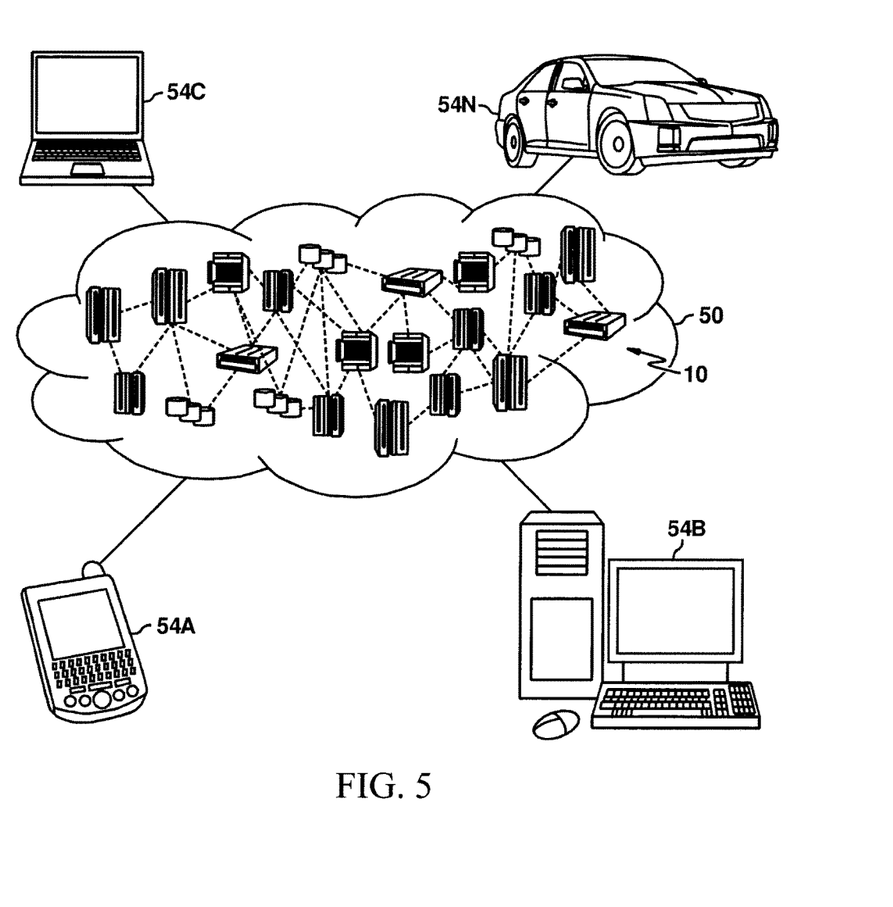
FIG. 5 depicts one embodiment of a cloud computing environment.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
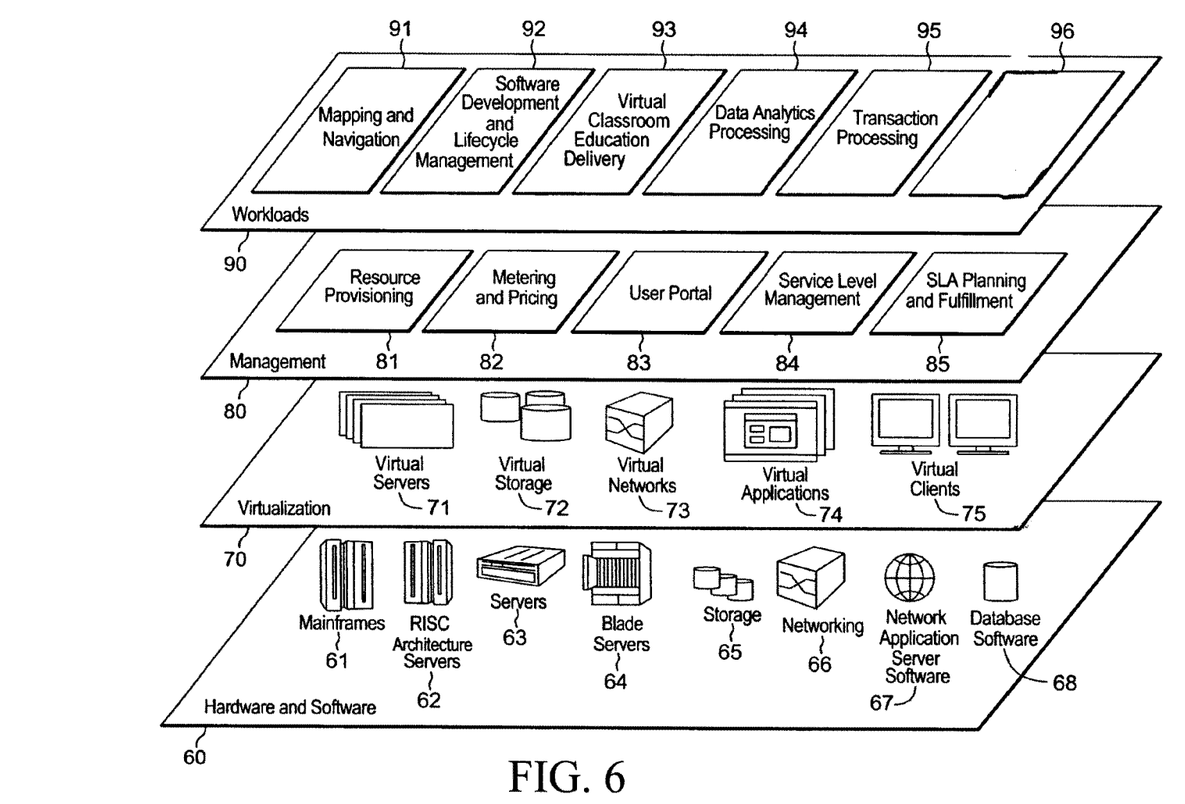
FIG. 6 depicts one example of abstraction model layers.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below, which may include maintaining VPD at a VPD location the computer system. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and analyzing the system costs associated with re-booting a computer system at a given time and/or during a given timeframe.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   obtaining, by one or more processors, a request for a re-boot of a system;
   obtaining, by the one or more processors, identifiers of tasks executing in the system at a given time;
   based on obtaining the identifiers, obtaining, by the one or more processors, a task cost of each task of the tasks at a the given time;
   determining, by the one or more processors, based on the task costs associated with the tasks, a re-boot cost for re-booting the system at the given time;
   determining, by the one or more processors, a system cost for not re-booting the system at the given time;
   comparing, by the one or more processors, the re-boot cost to the system cost to determine whether to re-boot the system at the given time in response to the request;
   determining, by the one or more processors, that the re-boot cost is less than or equal to the system cost at the given time;
   based on the determining that the re-boot cost is less, applying, by the one or more processors, the patch; and
   rebooting, by the one or more processors, the system at the given time.

2. The computer-implemented method of claim 1, further comprising:
   detecting, by the one or more processors, a vulnerability, wherein addressing the vulnerability requires applying a patch and re-booting the system.

3. The computer-implemented method of claim 1, further comprising:
   based on completing the rebooting, restarting, by the one or more processors, the tasks.

4. The computer-implemented method of claim 2, wherein the system cost comprises a quantified risk associated with failing to apply an update to the system, wherein the update corrects the vulnerability.

5. The computer-implemented method of claim 1, wherein the value of the task cost comprises a cost to the system associated with killing the task.

6. The computer-implemented method of claim 1, wherein the given time comprises a window of time.

7. The computer-implemented method of claim 1, wherein a portion of the tasks executing in the system comprise direct user tasks.

8. The computer-implemented of claim 1, further comprising:
   determining, by the one or more processors, that the re-boot cost is less than or equal to the system cost during a portion of the given time; and
   rebooting, by the one or more processors, the system during the portion of the given time.

9. The computer-implemented method of claim 1, further comprising:
   determining, by the one or more processors, that the re-boot cost is less than or equal to the system cost at the given time; and
   scheduling, by the one or more processors, the re-boot at the given time; and
   alerting, by the one or more processors, a user of the scheduled system re-boot.

10. The computer-implemented of claim 9, further comprising:
    obtaining, by the one or more processors, a request from the user not to re-boot the system at the given time; and
    based on the obtaining the request from the user, canceling, by the one or more processors, the scheduled system re-boot.

11. The computer-implemented of claim 9, further comprising:
    obtaining, by the one or more processors, an indication of an action in the system, wherein the action was selected from a group of predefined actions;
    analyzing, by the one or more processors, an impact of the action on the re-boot cost and the system cost;

adjusting, by the one or more processors, at least one of: the re-boot cost or the system cost, based on the impact;

based on the adjusting, replacing, by the one or more processors, the given time with a new re-boot time; and scheduling, by the one or more processors, the re-boot at the new time.

12. A computer program product comprising:

A non-transitory computer readable storage medium readable by one or more processors and storing instructions for execution by the one or more processors for performing a method comprising:

obtaining, by one or more processors, a request for a re-boot of a system;

obtaining, by the one or more processors, identifiers of tasks executing in the system at a given time;

based on obtaining the identifiers, obtaining, by the one or more processors, a task cost of each task of the tasks at a the given time;

determining, by the one or more processors, based on the task costs associated with the tasks, a re-boot cost for re-booting the system at the given time;

determining, by the one or more processors, a system cost for not re-booting the system at the given time;

comparing, by the one or more processors, the re-boot cost to the system cost to determine whether to re-boot the system at the given time in response to the request;

determining, by the one or more processors, that the re-boot cost is less than or equal to the system cost at the given time;

based on the determining that the re-boot cost is less, applying, by the one or more processors, the patch; and    rebooting, by the one or more processors, the system at the given time.

13. The computer program product of claim 12, the method further comprising:

detecting, by the one or more processors, a vulnerability, wherein addressing the vulnerability requires applying a patch and re-booting the system.

14. The computer program product of claim 12, the method further comprising:

based on completing the rebooting, restarting, by the one or more processors, the tasks.

15. The computer program product of claim 13, wherein the system cost comprises a quantified risk associated with failing to apply an update to the system, wherein the update corrects the vulnerability.

16. The computer program product of claim 12, wherein the value of the task cost comprises a cost to the system associated with killing the task.

17. The computer program product of claim 12, the method further comprising:

determining, by the one or more processors, that the re-boot cost is less than or equal to the system cost during a portion of the given time; and    rebooting, by the one or more processors, the system during the portion of the given time.

18. A system comprising:

one or more memories;

one or more processors in communication with the one or more memories; and program instructions executed by the one or more processors via the one or more memories to perform a method, the method comprising:

obtaining, by the one or more processors, identifiers of tasks executing in the system at a given time;

based on obtaining the identifiers, obtaining, by the one or more processors, a task cost of each task of the tasks at a the given time;

determining, by the one or more processors, based on the task costs associated with the tasks, a re-boot cost for re-booting the system at the given time;

determining, by the one or more processors, a system cost for not re-booting the system at the given time;

comparing, by the one or more processors, the re-boot cost to the system cost to determine whether to re-boot the system at the given time in response to the request;

determining, by the one or more processors, that the re-boot cost is less than or equal to the system cost at the given time;

based on the determining that the re-boot cost is less, applying, by the one or more processors, the patch; and    rebooting, by the one or more processors, the system at the given time.

* * * * *